US006207730B1

(12) United States Patent
Hogan, III

(10) Patent No.: US 6,207,730 B1
(45) Date of Patent: Mar. 27, 2001

(54) EPOXY AND MICROSPHERE ADHESIVE COMPOSITION

(75) Inventor: Martin T. Hogan, III, Oak Lawn, IL (US)

(73) Assignee: Daubert Chemical Company, Inc., Chicago, IL (US)

( * ) Notice: Subject to any disclaimer, the term of this patent is extended or adjusted under 35 U.S.C. 154(b) by 0 days.

(21) Appl. No.: 09/271,832

(22) Filed: Mar. 18, 1999

(51) Int. Cl.[7] .......... C08J 9/32

(52) U.S. Cl. .......... 523/219; 523/440; 523/443; 525/107; 525/113; 525/121; 525/132

(58) Field of Search .......... 523/219, 440, 523/443; 525/107, 113, 121, 132

(56) References Cited

U.S. PATENT DOCUMENTS 4,548,660 10/1985 Ikeda et al. .
4,548,863 10/1985 Hicks et al. .
4,662,663 5/1987 Schmitz .
4,670,339 6/1987 Frey .
4,726,986 2/1988 Cannady, Jr. et al. .
4,772,495 9/1988 Headrick et al. .
4,853,270 8/1989 Wycech .
4,923,902 5/1990 Wycech .
5,610,243 * 3/1997 Vielti et al. .......... 525/523
5,663,219 * 9/1997 Choski et al. .......... 523/404

* cited by examiner

*Primary Examiner*—Robert Dawson
*Assistant Examiner*—D. Aylward
(74) *Attorney, Agent, or Firm*—Wallenstein & Wagner, Ltd.

(57) ABSTRACT

An adhesive composition, which comprises either an A- or B-side epoxy, and further includes a plurality of microspheres blended into either the A-side epoxy alone, the B-side epoxy alone, or into both. The microspheres of the invention are preferably made of a thermoplastic shell. As a result of the use of this adhesive between two substrates, a thin, strong bond may be formed between those two substrates. The bond is formed by a combination of an epoxy and a plurality of the microspheres. This epoxy and microsphere combination substantially inhibits seepage of the epoxy through the holes in a first, porous substrate.

17 Claims, No Drawings

EPOXY AND MICROSPHERE ADHESIVE COMPOSITION

TECHNICAL FIELD

This invention relates to an adhesive composition especially suitable for securing a flexible, porous substrate to a more rigid substrate. The adhesive composition is made by adding microspheres to both the A- and B-sides of an epoxy composition.

BACKGROUND OF THE INVENTION

Epoxy adhesives are well-known in the art. These epoxy adhesives have many uses, including the bonding of substrates of various kinds. Epoxies are generally made by a combination of a so-called A-side epoxy and a so-called B-side epoxy.

One known use of an epoxy is to secure a vinyl sheet or film to a particle board. The combination of the vinyl sheet or film and the particle board, luaun or medium density fiberboard creates an aesthetically pleasing, solid structure that can be used in a variety of applications, as for example as a decorative element in the interiors of either prefabricated homes or motor homes.

The use of epoxy on such vinyl sheet/particle board composite structures has generally proven to be effective, when those vinyl sheets are smooth and non-porous. However, problems have arisen when epoxy is used to secure an embossed vinyl onto particle boards.

This is because the embossing process creates tiny holes that pass from the front side to the back side of the vinyl. These holes may be imperceptible to the eye, but are sufficiently large to permit the passage of the epoxy. Thus, when the vinyl is secured to the particle board with the epoxy, the epoxy passes through these tiny holes. This can damage the aesthetic appearance of the vinyl.

In addition, after the epoxy is used to adhere the vinyl to the particle board, the composite structure must dry. In order to dry, the composite structures are stacked upon each other. When the epoxy seeps through the vinyl of one of the composite structures, that epoxy wets the particle board of an adjacent composite structure. A day later, when one attempts to separate the respective composite structures, the epoxy has cured, and the vinyl of the first structure is adhered to the particle board of the adjacent structure. This prevents the "clean" separation of the adjacent composite structures, and can result in damage to those structures when one attempts their separation.

Thus, there is a need for an adhesive that will prevent the problems created by prior art epoxies.

SUMMARY OF THE INVENTION

The invention is an adhesive composition, which comprises an A- or B-side epoxy, and further includes a plurality of microspheres blended into either the A-side epoxy alone, the B-side epoxy alone, or into both. The microspheres of the invention are preferably made of a thermoplastic shell.

Preferably, the microspheres are made of an acrylonitrile copolymer, and have a weight average diameter of between 60 and 90 microns. Most preferably, the microspheres are dry, expanded microspheres.

As a result of the use of this adhesive between the two substrates, a thin, strong bond is formed. The first of these two adhered substrates may include relatively small holes whose size is nevertheless sufficient to cause some problems, if a conventional epoxy were used. Specifically, the holes in this first substrate would normally be subject to unacceptable levels of liquid seepage if a liquid epoxy adhesive were used to bond those substrates. The bond is formed by a combination of an epoxy and a plurality of microspheres. This epoxy and microsphere combination substantially inhibits seepage of the epoxy through any holes in the first substrate.

DETAILED DESCRIPTION

This invention may include many different embodiments. Preferred embodiments of the invention are described, but with the understanding that the present disclosure is to be considered as but one example of the principles of the invention. It is not intended to limit the broad aspect of the invention to the illustrated embodiments.

The invention is an adhesive composition, which comprises either an A- or B-side epoxy, and further includes a plurality of microspheres blended into either the A-side epoxy alone, the B-side epoxy alone, or into both.

EXAMPLE 1

The A-side and B-side epoxy are conventional, and can be made with any of the known epoxies components.

A-Side

In the present embodiment, one preferred A-side epoxy is Daubond 6462A, made by Daubert Chemical Company, Inc., 4700 South Central, Chicago, Ill. 60638.

A total of 99.8171 pounds of the A-side epoxy is charged to a water-cooled blending tank having a mixer.

The microspheres are made by Expancel-Nobel Industries Sweden, 1519 Johnson Ferry Road, Suite 200, Marietta, Ga. 30062. The microspheres used in this preferred embodiment are the Expancel® 091 DE-80 (dry expanded) microspheres. These microspheres have an average particle size of 60–90 microns.

The microspheres in an amount of 0.1829 pounds are added to the A-side in the blending tank and this blend is then mixed for fifteen minutes.

Because the microspheres are of such low density, it is necessary to use care when adding them to the blending tank. Even small air currents can result in the inadvertent scattering of these microspheres into the air, and their falling to the ground outside of the blending tank. If this were to happen, it would change the effective percentage of microspheres in the blend, and potentially change the characteristics of that blend. One way of lowering this possibility is charge the A-side, then pump the microspheres into the bottom of the separate tank.

B-Side

In the present embodiment, one preferred B-side epoxy is Daubond 6462B, available from Daubert Chemical Company, Inc., 4700 South Central, Chicago, Ill. 60638.

The B-side epoxy, a total of 99.7798 pounds, is placed into a water-cooled blending tank having a mixer. With the cooling water on, the B-side is mixed for fifteen minutes. The microspheres, in an amount of 0.2202 pounds, are then added to this B-side epoxy.

As with the blending of the A-side component of the epoxy, because the microspheres are of such low density, it is necessary to use care when adding them to the blending tank. Even small air currents can result in their scattering into the air, and their falling outside of the blending tank. As with the A-side component discussed above, one way of lowering this possibility is to first place the A-side epoxy into the blending tank, and then pump the microspheres into the bottom of that tank.

Microspheres

The microspheres of the invention are preferably made of a thermoplastic shell. The thermoplastic nature of the shell, and the thinness of that shell, enables the microspheres to be compressed under external pressure.

Preferably, the microspheres are made of an acrylonitrile copolymer, and have a diameter of between 60 and 90 microns. Most preferably, the microspheres are dry, expanded microspheres. The Expancel® 091 DE-80 microspheres are made of an acrylonitrile-methyl methacrylate copolymer.

As a result of the use of this adhesive between two substrates, a thin, strong bond may be formed between the substrates. The first of these two adhered substrates may include relatively small holes whose size is nevertheless sufficient to cause some problems with a conventional epoxy. Specifically, the holes in this first substrate would normally be subject to unacceptable levels of liquid seepage when a liquid epoxy adhesive is used to bond those substrates. The bond is formed by a combination of an epoxy and a plurality of microspheres. This epoxy and microsphere combination substantially inhibits seepage of the epoxy through the holes in the first substrate.

Particularly, when an epoxy with the microspheres of this Example 1 was compared to an epoxy without these microspheres, seepage through holes in the vinyl substrate is lowered by the presence of the microspheres.

Many epoxy/microsphere combinations will yield the benefits of the present invention. This is evident from the data summarized in the accompanying Tables 1 and 2.

EXAMPLES 2–9

Alternative Embodiments of Table 1

In Table 1, the same microspheres as those of Example 1 were used. However, the weight and volume percentages of these microspheres in the epoxy was varied.

TABLE 1

| | Control (6462 A/B) | Example 2 | Example 3 | Example 4 | Example 5 | Example 6 | Example 7 | Example 8 | Example 9 |
|---|---|---|---|---|---|---|---|---|---|
| x6462 "A" | — | 256.99 | 256.99 | 256.99 | 256.99 | 256.99 | 256.99 | 256.99 | 256.99 |
| Expancel 091 DE-80 | — | .05 | .12 | .24 | .35 | .47 | .71 | .94 | 1.41 |
| Viscosity | 4000 cps | 5000 cps | 5200 cps | 5600 cps | 5800 cps | 6800 cps | 7000 cps | 8000 cps | 9400 cps |
| x6462 "B" | — | 213.41 | 213.41 | 213.41 | 213.41 | 213.41 | 213.41 | 213.41 | 213.41 |
| Expancel 091 DE-80 | — | .05 | .12 | .24 | .35 | .47 | .71 | .94 | 1.41 |
| Viscosity | 4000 cps | 4600 cps | 5000 cps | 5400 cps | 5500 cps | 6200 cps | 6800 cps | 7600 cps | 9600 cps |
| % Expancel: | | | | | | | | | |
| By Weight = | — | .02 | .05 | .10 | .15 | .20 | .30 | .40 | .60 |
| By Volume = | — | 1.16 | 2.74 | 5.34 | 7.60 | 9.95 | 14.31 | 18.10 | 24.90 |
| Top Board | 4 | 4 | 3 | 0 | 2 | 1 | 0 | 0 | 0 |
| 2nd | 3 | 4 | 0 | 0 | 0 | 2 | 0 | 0 | 0 |
| 3rd | 2 | 2 | 2 | 2 | 0 | 0 | 1 | 0 | 0 |
| 4th | 6 | 0 | 0 | 2 | 4 | 0 | 1 | 0 | 0 |
| 5th | 6 | 3 | 1 | 2 | 2 | 0 | 0 | 0 | 0 |
| 6th | 0 | 3 | 0 | 1 | 0 | 1 | 0 | 1 | 0 |
| 7th | 7 | 4 | 2 | 1 | 0 | 1 | 0 | 0 | 0 |
| 8th | 3 | 3 | 3 | 1 | 0 | 1 | 0 | 0 | 0 |
| 9th | 8 | 1 | 1 | 2 | 0 | 0 | 0 | 0 | 0 |
| 10th | 3 | 2 | 3 | 3 | 4 | 0 | 0 | 0 | 0 |
| Total # of Holes (out of 130) | 42 | 26 | 15 | 14 | 12 | 6 | 2 | 1 | 0 |
| % Seepage | 32% | 20% | 12% | 11% | 9% | 5% | 2% | 1% | 0% |
| Holes w/: | | | | | | | | | |
| Large Seepage | 21 | 7 | 7 | 5 | 3 | 1 | 0 | 0 | 0 |
| Medium Seepage | 4 | 8 | 4 | 4 | 4 | 3 | 1 | 1 | 0 |
| Small Seepage | 17 | 11 | 4 | 5 | 5 | 2 | 1 | 0 | 0 |
| Seepage from Holes Made: | | | | | | | | | |
| Face to Back | 13 | 6 | 8 | 6 | 6 | 1 | 0 | 1 | 0 |
| Back to Face | 29 | 20 | 7 | 8 | 6 | 5 | 2 | 0 | 0 |

For example, in Example 2 in Table 1, 0.05 pounds of Expancel® 091 DE-80 was added to 256.99 pounds of the "A"-stage epoxy, and 0.05 pounds of the Expancel® 091 DE-80 was added to 213.41 pounds of the "B"-stage epoxy. As a result, the total microspheres in the epoxy blend was 0.02% by weight, or 1.16% by volume.

In Examples 3–9 in Table 1, the amount of Expancel® 091 DE-80 was increased gradually from 0.05% (wt.) to 1.41% (wt.), which corresponds to 2.74% (vol.) to 24.90% (vol.).

An increase in the amount of microspheres results in a dramatic reduction of seepage through the porous vinyl portions of a vinyl/particle board composite, as may be seen in Table 1.

In order to determine the effectiveness of the addition of the microspheres to the epoxy, testing is performed as follows. The substrates are a highly embossed white vinyl sheet, and a particle board. Both the vinyl sheet and the particle board were cut into 4" by 4" pieces. Thirteen pinholes were placed into each of the 4" by 4" vinyl sheet pieces. Nine of the holes were made through the vinyl in the direction of the embossing, i.e, from the front of the vinyl sheet to the back. The remaining four holes were made in the opposite direction, i.e., from the back to the front of the vinyl sheet.

The vinyl sheets were adhered to the particle board with epoxy/microsphere adhesive at a thickness of 2 mils (0.002"). They were stacked in piles of 10, i.e., ten vinyl/epoxy/microsphere/particle board composites stacked upon each other, and were left to cure for twenty-four hours at a temperature of 77° F. The stack pressure was about 3700 grams over this 4" by 4" composite, or about 0.5 psi.

At the end of the twenty-four hours, the stacked composites were separated. They were then visually evaluated to determine the number of holes in each composite through which epoxy had seeped.

For example, Table 1 demonstrates that for Example 5, with 0.15% (wt.) loading of microspheres, epoxy seeped through 2 of the 13 holes in the top board of the ten-board stack. No epoxy seeped through any of the thirteen holes in either the 2nd and 3rd boards of this stack. Epoxy seeped through four of the thirteen holes in the fourth board. As summarized at the line of Table 1 entitled "Total # of holes (out of 130)", twelve holes out of the 130 holes (9%) in this ten board stack showed signs of seepage. This performance was a substantial improvement over the control at the first column of Table 1. The control included an identical epoxy, but without microspheres. In that control, 42 holes out of the hundred and thirty (32%) showed some seepage.

The other Examples in Table 1 also showed improved performance at the various microsphere loadings. Particularly, with each increase in loading, the percent seepage increased. At a 0.02% by weight loading of microspheres, the percent seepage was 20%. At 0.30%, 0.40% and 0.60% by weight microsphere loading, as shown in Examples 7, 8, and 9, the percent of holes exhibiting seepage dropped to 2%, 1%, and 0%.

EXAMPLES 10–17—ALTERNATIVE EMBODIMENTS OF TABLE 2

The same kinds of vinyl/epoxy/particle board composites were used for Examples 10–17, shown in Table 2. In these eight Examples, however, microspheres other than the type used in Examples 1–9, at a uniform loading of 10% (vol.), were added to the epoxy.

TABLE 2

| | Example 10 | Example 11 | Example 12 | Example 13 | Example 14 | Example 15 | Example 16 | Example 17 |
|---|---|---|---|---|---|---|---|---|
| x6462 "A" | 256.99 | 256.99 | 256.99 | 256.99 | 256.99 | 256.99 | 256.99 | 256.99 |
| Expancel 091 DE-50 | .47 | — | — | — | — | — | — | — |
| Expancel 551 DE-20 | — | .92 | — | — | — | — | — | — |
| Expancel 461 DE-20 | — | — | 1.12 | — | — | — | — | — |
| Dualite M6001AE | — | — | — | 2.42 | — | — | — | — |
| Dualite M6050AE | — | — | — | — | 2.42 | — | — | — |
| Dualite MS7000 | — | — | — | — | — | 1.21 | — | — |
| Ucar BJO-0930 | | — | — | — | — | — | 4.30 | — |
| Q-Cel 2116 | — | — | — | — | — | — | — | 2.42 |
| Viscosity | 5500 cps | 6000 cps | 5800 cps | 6400 cps | 5400 cps | 5000 cps | 5600 cps | 5700 cps |
| x6462 "B" | 213.41 | 213.41 | 213.41 | 213.41 | 213.41 | 213.41 | 213.41 | 213.41 |
| Expancel 091 DE-50 | .47 | — | — | — | — | — | — | — |
| Expancel 551 DE-20 | — | .92 | — | — | — | — | — | — |
| Expancel 461 DE-20 | — | — | 1.12 | — | — | — | — | — |
| Dualite M6001AE | — | — | — | 2.42 | — | — | — | — |
| Dualite M6050AE | — | — | — | — | 2.42 | — | — | — |
| Dualite MS7000 | — | — | — | — | — | 1.21 | — | — |
| Ucar BJO-0930 | | — | — | — | — | — | 4.30 | — |
| Q-Cel 2116 | — | — | — | — | — | — | — | 2.42 |
| Viscosity | 5000 cps | 5500 cps | 5400 cps | 5400 cps | 5200 cps | 5200 cps | 6300 cps | 5400 cps |
| % Microspheres: | | | | | | | | |
| By Wt = | .20 | .39 | .47 | 1.02 | 1.02 | .51 | 1.80 | 1.02 |
| By Vol = | 9.95 | 9.97 | 9.96 | 9.96 | 9.96 | 9.96 | 10.00 | 9.96 |

TABLE 2-continued

| | Example 10 | Example 11 | Example 12 | Example 13 | Example 14 | Example 15 | Example 16 | Example 17 |
|---|---|---|---|---|---|---|---|---|
| Top Board | 2 | 4 | 3 | 0 | 0 | 0 | 0 | 0 |
| 2nd | 1 | 2 | 2 | 0 | 0 | 0 | 0 | 0 |
| 3rd | 0 | 3 | 6 | 2 | 1 | 4 | 1 | 0 |
| 4th | 5 | 2 | 1 | 5 | 2 | 2 | 1 | 1 |
| 5th | 2 | 1 | 1 | 1 | 0 | 3 | 1 | 0 |
| 6th | 1 | 0 | 1 | 3 | 2 | 5 | 0 | 0 |
| 7th | 2 | 1 | 2 | 1 | 0 | 1 | 2 | 0 |
| 8th | 1 | 0 | 7 | 4 | 2 | 1 | 1 | 1 |
| 9th | 2 | 3 | 6 | 3 | 3 | 5 | 2 | 0 |
| 10th | 0 | 1 | 1 | 2 | 0 | 6 | 0 | 2 |
| Total # of Holes (out of 130) | 16 | 17 | 30 | 21 | 10 | 27 | 8 | 4 |
| % Seepage | 12% | 13% | 23% | 16% | 8% | 21% | 6% | 3% |
| Holes w/: | | | | | | | | |
| Large Seepage | 2 | 7 | 7 | 1 | 1 | 12 | 2 | 0 |
| Medium Seepage | 3 | 2 | 7 | 11 | 4 | 9 | 2 | 3 |
| Small Seepage | 11 | 8 | 16 | 9 | 5 | 6 | 4 | 1 |
| Seepage from Holes Made: | | | | | | | | |
| Face to Back | 11 | 16 | 15 | 14 | 6 | 20 | 7 | 3 |
| Back to Face | 5 | 1 | 15 | 7 | 4 | 7 | 1 | 1 |

Particularly, the microspheres used for this testing were Expancel® 091 DE-50, whose particles have a weight average diameter of 35 to 55 microns; Expancel® 551 DE-20, whose particles have a weight average diameter of 15 to 25 microns; Expancel® 461 DE-20, whose particles have a weight average diameter of 15 to 25 microns; Dualite® low density microspheres, including Dualite® M6001AE (polyvinylidene chloride shell, 40–45 microns mode particle size), M6050AE (acrylonitrile shell, 100–110 microns mode particle size), and MS7000 (acrylonitrile shell, 130–150 microns particle size), all three products of Pierce & Stevens Corporation, 710 Ohio Street, Buffalo, N.Y. 14203; Ucar® BJO-0930 phenolic "microballoons", small hollow spheres of phenolic resin, ranging in diameter from 0.0002 to 0.005 inch, with a typical diameter of 0.0017 inch; and Q-Cel® 2116 hollow microspheres, made by The PQ Corporation, Specialty Products Division, P.O. Box 840, Valley Forge, Pa. 19482. Q-Cel® hollow microspheres are borosilicate spheres, having a mean particle size of 89 microns, with about 90% of the particles being in a range of from 34 to 156 microns.

In each of the Examples 10–17, both the A-side and B-side components of the epoxy include the identical volume (about 10%) of the microspheres. For example, in Example 15, 1.21 grams of Dualite® MS7000 is placed into each of the A- and B-sides of the epoxy, resulting in an epoxy blend having a total of 0.51% (wt.) or 9.96% (vol.) microspheres in the epoxy/microsphere blend.

Using these different microspheres at a constant volume percent of approximately 10.0%, Table 2 demonstrates that Examples 10–17 reduce seepage over the control epoxy at the first column of Table 1. Using these differing microspheres, seepage is reduced to between 3% and 23%, compared to 32% for the control.

Specific embodiments have been illustrated and described. Numerous modifications are possible, which modifications do not significantly depart from the spirit of the invention. Protection is only limited by the scope of the accompanying claims.

What I claim is:

1. A two-part adhesive composition, comprising an epoxy as an A-side, and further comprising a B-side, of a polyamide resin, blended with said A-side, said composition further comprising microspheres blended into said epoxy, said microspheres present in said adhesive composition in an amount of between 0.02% (wt.) and 0.60% (wt.).

2. The adhesive composition of claim 1, wherein said microspheres are made of a thermoplastic shell.

3. The adhesive composition of claim 2, wherein said the thermoplastic shell of said microspheres encapsulates a gas.

4. The adhesive composition of claim 1, wherein said microspheres are made of an acrylonitrile copolymer.

5. The adhesive composition of claim 1, wherein said microspheres are of a diameter of between 60 and 90 microns.

6. The adhesive composition of claim 4, wherein said microspheres are dry, expanded microspheres.

7. An adhesive composition, comprising an epoxy as an A-part, and further comprising a polyamide resin as a B-part, said adhesive further comprising a plurality of microspheres made of a thermoplastic shell encapsulating a gas.

8. The adhesive composition of claim 2, wherein said thermoplastic is an acrylonitrile copolymer.

9. The adhesive composition of claim 7, wherein said microspheres are of a weight average diameter of between 60 and 90 microns.

10. The adhesive composition of claim 7, wherein said microspheres are dry, expanded microspheres.

11. A thin bond between two substrates, said two substrates comprising at least a first substrate having holes therein, which first substrate would normally be subject to liquid seepage when a liquid adhesive was used to bond those substrates, said bond being formed of a two-part epoxy composition and a plurality of microspheres added to said two-part epoxy composition, whereby said two-part epoxy and microsphere combination substantially inhibits seepage of said two-part epoxy through said holes in said first substrate.

12. An adhesive composition, comprising a two-part epoxy composition, and a plurality of microspheres blended into said epoxy, wherein said microspheres are made of a acrylonitrile copolymer, polyvinylidene chloride, borosilicate, or a phenolic material.

13. The adhesive composition of claim 12, wherein said shell of said microspheres encapsulates a gas.

14. The adhesive composition of claim 12, wherein said microspheres are of a diameter between 60 and 90 microns.

15. The adhesive composition of claim 12, wherein said microspheres are of a diameter of between 20 and 156 microns.

16. The adhesive composition of claim 12, wherein said microspheres are dry, expanded microspheres.

17. The adhesive composition of claim 12, wherein said microspheres are present in said adhesive composition in an amount of between 0.02% (wt.) and 0.60% (wt.).

* * * * *

UNITED STATES PATENT AND TRADEMARK OFFICE

CERTIFICATE OF CORRECTION

PATENT NO. : 6,207,730 B1
DATED : March 27, 2001
INVENTOR(S) : Martin T. Hogan, III It is certified that error appears in the above-identified patent and that said Letters Patent is hereby corrected as shown below:

Column 8,
Line 37, after the word “wherein”, delete the word “said”.
Line 51, delete “claim 2” and insert “claim 7”.

Signed and Sealed this

Fifth Day of October, 2004

JON W. DUDAS
*Director of the United States Patent and Trademark Office*